United States Patent
Nagatsu et al.

(10) Patent No.: US 12,335,606 B2
(45) Date of Patent: Jun. 17, 2025

(54) IMAGE PICKUP APPARATUS INCLUDING BUILT-IN OPTICAL FILTER, CONTROL METHOD OF IMAGE PICKUP APPARATUS, AND STORAGE MEDIUM

(71) Applicant: CANON KABUSHIKI KAISHA, Tokyo (JP)

(72) Inventors: Sho Nagatsu, Kanagawa (JP); Kazuaki Yamana, Kanagawa (JP); Yoshikazu Asai, Kanagawa (JP); Yuki Totori, Tokyo (JP); Keisuke Adachi, Tokyo (JP); Shoma Mizutani, Tokyo (JP); Nagisa Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 190 days.

(21) Appl. No.: 18/176,740

(22) Filed: Mar. 1, 2023

(65) Prior Publication Data
US 2023/0283907 A1    Sep. 7, 2023

(30) Foreign Application Priority Data

Mar. 3, 2022 (JP) ................................ 2022-032364

(51) Int. Cl.
| H04N 23/63 | (2023.01) |
| H04N 23/55 | (2023.01) |
| H04N 23/667 | (2023.01) |
| H04N 23/67 | (2023.01) |
| H04N 23/72 | (2023.01) |

(52) U.S. Cl.
CPC .......... *H04N 23/634* (2023.01); *H04N 23/55* (2023.01); *H04N 23/667* (2023.01); *H04N 23/67* (2023.01); *H04N 23/72* (2023.01)

(58) Field of Classification Search
None
See application file for complete search history.

(56) References Cited

U.S. PATENT DOCUMENTS

| 2006/0226341 | A1* | 10/2006 | Washisu | H04N 23/843 348/E5.045 |
| 2017/0126957 | A1* | 5/2017 | Uchida | H04N 23/54 |
| 2017/0343765 | A1* | 11/2017 | Maruyama | G02B 7/023 |
| 2018/0027166 | A1* | 1/2018 | Uchida | G03B 11/00 348/228.1 |
| 2020/0007756 | A1* | 1/2020 | Tsuchiya | H04N 23/667 |

FOREIGN PATENT DOCUMENTS

JP    2002-229116 A    8/2002

* cited by examiner

*Primary Examiner* — Paul M Berardesca
(74) *Attorney, Agent, or Firm* — Cowan, Liebowitz & Latman, P.C.

(57) ABSTRACT

An image pickup apparatus includes an image sensor, an optical filter movable between a first position at which the optical filter is inserted into an imaging range of the image sensor and a second position at which the optical filter is retracted from the imaging range, and a control unit configured to perform exposure control for the image sensor in a case where the optical filter is located at the first position and an in-focus state cannot be obtained by moving a focus lens.

15 Claims, 12 Drawing Sheets

IMAGE PICKUP APPARATUS INCLUDING BUILT-IN OPTICAL FILTER, CONTROL METHOD OF IMAGE PICKUP APPARATUS, AND STORAGE MEDIUM

BACKGROUND

Technical Field

The disclosure relates to an image pickup apparatus having a built-in optical filter, a control method of the image pickup apparatus, and a storage medium.

Description of the Related Art

An image pickup apparatus including an optical filter such as a light attenuating filter (neutral density (ND) filter) has conventionally been known. In a case where a flange focal length is adjusted in a camera having a built-in ND filter so that an imaging plane is in focus while the ND filter is not used, an optical path length changes after the ND filter is used, and thus the imaging plane may not be focused on a close object. Japanese Patent Laid-Open No. ("JP") 2002-229116 discloses an image pickup apparatus having a warning unit configured to warn a user that an optical filter is or is not used.

The image pickup apparatus disclosed in JP 2002-229116 may not be focused on a close object while the optical filter is used.

SUMMARY

One of the aspects of the embodiment provides an image pickup apparatus that can provide an in-focus state on an object in a case where the in-focus state cannot be obtained by moving a focus lens while an optical filter is used.

An image pickup apparatus according to one aspect of the disclosure includes an image sensor, an optical filter movable between a first position at which the optical filter is inserted into an imaging range of the image sensor and a second position at which the optical filter is retracted from the imaging range, and at least one processor, and a memory coupled to the at least one processor, the memory having instructions that, when executed by the processor, perform operations as a control unit configured to perform exposure control for the image sensor in a case where the optical filter is located at the first position and an in-focus state cannot be obtained by moving a focus lens. A control method of the above image pickup apparatus and a storage medium storing a program that causes a computer to execute the above control method also constitute another aspect of the disclosure.

Further features of the disclosure will become apparent from the following description of exemplary embodiments with reference to the attached drawings. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

DESCRIPTION OF THE EMBODIMENTS

Figure 1A:
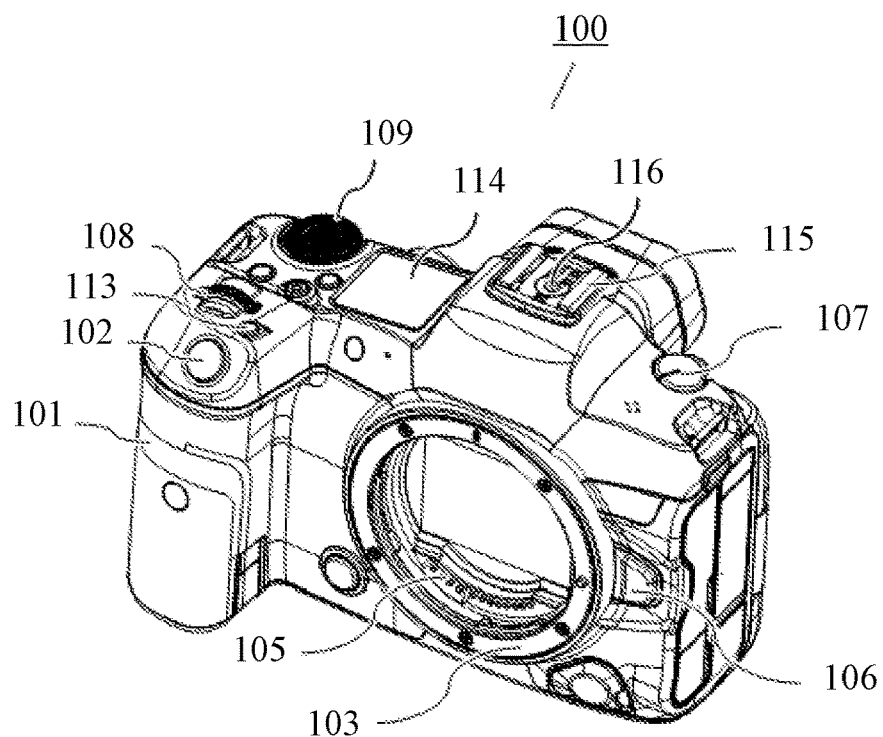
FIGS. 1A and 1B are external perspective views of an image pickup apparatus according to this embodiment.

Referring now to the accompanying drawings, a detailed description will be given of embodiments according to the disclosure. Corresponding elements in respective figures will be designated by the same reference numerals. This embodiment is an example for realizing the disclosure, and should be properly modified or changed according to the configuration of the apparatus to which the disclosure is applied and a variety of conditions, and the disclosure is not limited to the following embodiment. Parts of the embodiment described below may be combined as appropriate.

Figure 1B:
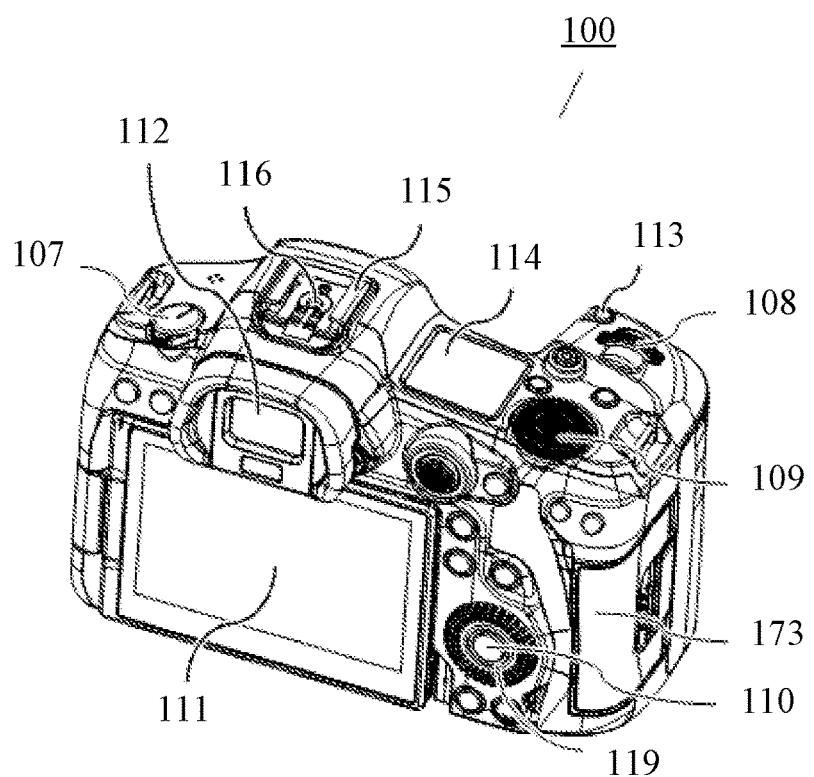

Referring now to FIGS. 1A and 1B, a description will be given of an image pickup apparatus according to this embodiment. FIGS. 1A and 1B are external perspective views of an image pickup apparatus (camera body) 100 according to this embodiment. FIG. 1A is an external perspective view of the image pickup apparatus 100 viewed from a front side, and illustrates a state in which a lens apparatus (interchangeable lens) 104 (see FIG. 2) attachable to the image pickup apparatus 100 is detached. FIG. 1B is an external perspective view of the image pickup apparatus 100 viewed from a rear side. This embodiment describes an imaging system in which the lens apparatus 104 is attachable to and detachable from the image pickup apparatus (camera body) 100, but is not limited to this example, and is applicable to an image pickup apparatus in which the camera body and the lens apparatus are integrated with each other.

The image pickup apparatus 100 includes a grip portion 101 to be gripped by a user to stably hold the image pickup apparatus 100. A shutter button 102 that is a switch for starting imaging is provided on a top portion of the grip portion 101. Amount portion (lens mount) 103 is provided in front of the image pickup apparatus 100, and the lens apparatus 104 is attachable to and detachable from the image pickup apparatus 100 via the mount portion 103. A mount contact 105 electrically connects the image pickup apparatus 100 and the lens apparatus 104, supplies power to the lens apparatus 104, and performs lens control and communication about lens data through an electric signal. In interchanging the lens apparatus 104, an engagement is released by pressing a lens unlock button 106, and the lens apparatus 104 can be detached.

A power switch 107 is used to power on or off the image pickup apparatus 100. A main electronic dial 108 and a sub electronic dial 119 are rotary operation members that are clockwise and counterclockwise rotatable, and the rotating operation can change a variety of set values such as an F-number and a shutter speed. A mode switching dial 109 is an operation unit for switching an imaging mode among a variety of modes such as a shutter speed priority imaging mode, an F-number priority imaging mode, and a moving (or motion) image capturing mode. A SET button 110 is a push button and is mainly used to determine selection items.

A liquid crystal monitor 111 displays a variety of setting screens, captured images, and live-view images of the image pickup apparatus 100. An electronic viewfinder (EVF) 112 is a viewfinder that can be used to display a variety of setting screens, captured images, and live-view images of the image pickup apparatus 100. A multifunction button 113 is a push button, and the user can arbitrarily assign and use a variety of setting switches relating to imaging. A display panel 114 displays a variety of set states of the image pickup apparatus 100 such as an imaging mode and an ISO speed. The display panel 114 is displayed even if the image pickup apparatus 100 is powered off.

An accessory shoe 115 has an accessory contact point 116, and a variety of accessories such as an external strobe and microphone can be attached to it. A media slot lid 173 can be opened and closed, and in a case where it is open, an external recording medium 148 (see FIG. 2) such as an SD card can be inserted into or ejected from an internal media slot (not illustrated).

Figure 2:
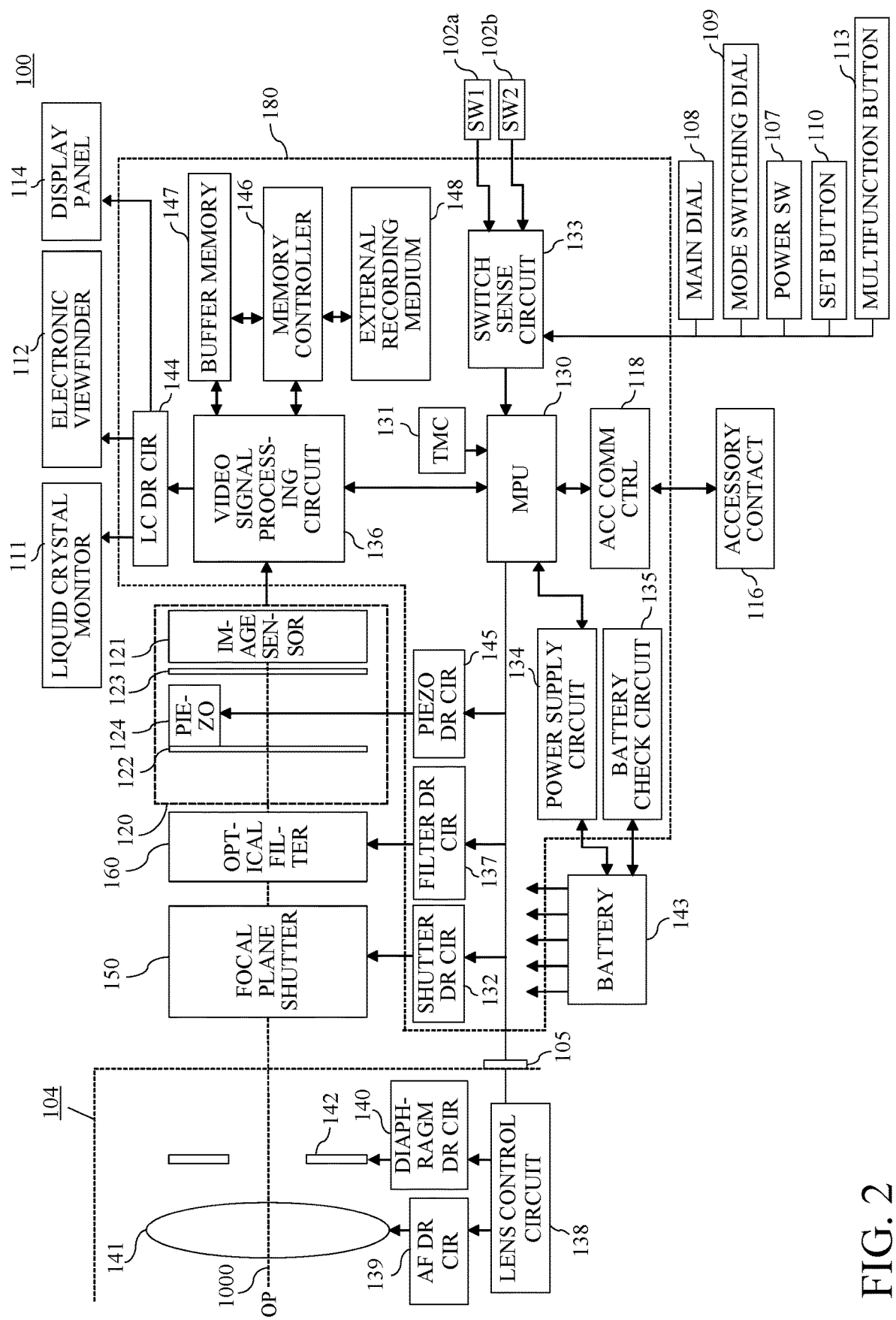
FIG. 2 is a block diagram of the image pickup apparatus according to this embodiment.

Referring now to FIG. 2, a description will be given of an electric configuration and operation of the image pickup apparatus 100. FIG. 2 is a block diagram of the image pickup apparatus 100 and illustrates a state in which the lens apparatus 104 is attached. Elements common to those in FIGS. 1A and 1B will be designated by the same reference numerals.

An MPU 130 is a small central processing unit (CPU) (control unit) built in the image pickup apparatus 100. A time measuring circuit (TMC) 131, a shutter driving circuit 132, a switch sense circuit 133, a power supply circuit 134, a battery check circuit 135, a video signal processing circuit 136, an optical filter driving circuit 137, and a piezoelectric element driving circuit 145 are connected to the MPU 130. The MPU 130 controls the operation of the image pickup apparatus 100, processes input information, and instructs and controls each element. The MPU 130 has an EEPROM, which can store time information from the time measuring circuit 131 and various setting information.

The MPU 130 also communicates with a lens control circuit 138 built in the lens apparatus 104 via the mount contact 105. Thereby, the MPU 130 can control the operations of a focus lens 141 and an electromagnetic diaphragm (diaphragm, aperture stop) 142 via an AF driving circuit 139 or a diaphragm driving circuit 140. Although FIG. 2 schematically illustrates a single focus lens 141 as an imaging optical system of the lens apparatus 104, the imaging optical system actually includes many lens units.

The AF driving circuit 139 is connected, for example, to a stepping motor (not illustrated) and drives the focus lens 141. The MPU 130 calculates a focus lens driving amount according to a detected defocus amount using the focus signal read out of the image sensor 121 and transmits a focus command including a focus lens driving amount to the lens control circuit 138. The lens control circuit 138 that has received the focus command controls driving of the focus lens 141 through the AF driving circuit 139. Thereby, autofocus (AF) is performed.

The diaphragm driving circuit 140 is connected to a diaphragm actuator such as a stepping motor (not illustrated) and drives a plurality of aperture blades (not illustrated) that form an aperture in the electromagnetic diaphragm (aperture stop) 142. Driving a plurality of aperture blades can change an aperture size (aperture diameter) and adjust a light amount.

The MPU 130 calculates a diaphragm driving amount of the electromagnetic diaphragm 142 based on a luminance signal read out of the image sensor 121 and transmits a diaphragm command including the diaphragm driving amount to the lens control circuit 138. That is, the MPU 130 communicates with the lens control circuit 138 to control the electromagnetic diaphragm 142. The lens control circuit 138 that has received the diaphragm command controls the driving of the electromagnetic diaphragm 142 through the diaphragm driving circuit 140. Thereby, a proper aperture value (F-number) is automatically set.

A mechanical focal plane shutter (FPS) 150 is driven by the shutter driving circuit 132. During imaging, a front curtain shutter (not illustrated) is moved to open the shutter when the user presses the shutter button 102, and a rear curtain shutter (not illustrated) is moved according to the desired exposure time to close the shutter. The exposure time to the image sensor 121 is thereby controlled.

An optical filter 160 is an optical element that imparts a special effect to an image by diffusing incident light or attenuating a specific wavelength range. The optical filter 160 includes an ND filter that attenuates an incident light amount at a constant rate, a polarized light (PL) filter that suppresses reflected light using a polarization film, and a soft filter that diffuses light to create a soft expression, but the optical filter 160 is not limited to these filters. The optical filter 160 can be driven and its position is movable by the optical filter driving circuit 137. A detailed configuration of the optical filter 160 will be described below.

An imaging unit 120 mainly includes an optical low-pass filter 122, an optical low-pass filter holder 123, a piezoelectric element (piezoelectric member) 124, and an image sensor 121 each configured as a unit. The image sensor 121 photoelectrically converts an object image (optical image) formed through the lens apparatus 104. In this embodiment, the image sensor 121 is a Complementary Metal-Oxide-Semiconductor (CMOS) sensor, but is not limited to this example. The image sensor 121 may use a Charge-Coupled Device (CCD) sensor, a Charge Injection Device (CID)

sensor, or the like. The optical low-pass filter 122 disposed in front of the image sensor 121 is a single birefringent plate made of crystal and has a rectangular shape. The piezoelectric element 124 is a single-plate piezoelectric element (piezo element), and is vibrated by a piezoelectric element driving circuit 145 that receives an instruction from the MPU 130 and transmits the vibration to the optical low-pass filter 122. Fine dust attached to the optical low-pass filter 122 can be shaken off by this vibration.

The video signal processing circuit 136 governs overall image processing such as filtering and data compression processing for the electric signal obtained from the image sensor 121. Image data for monitor display from the video signal processing circuit 136 is displayed on the liquid crystal monitor 111 and the electronic viewfinder 112 via the liquid crystal driving circuit 144. The video signal processing circuit 136 can also store image data in a buffer memory 147 through a memory controller 146 according to an instruction from the MPU 130. The video signal processing circuit 136 can also perform image data compression processing such as JPEG. In a case where continuous imaging is performed, image data can be temporarily stored in the buffer memory 147 and unprocessed image data can be sequentially read out through the memory controller 146. Thereby, the video signal processing circuit 136 can sequentially perform image processing and compression processing regardless of the speed of input image data.

The memory controller 146 has a function of storing image data in the external recording medium 148 and a function of reading image data stored in the external recording medium 148. The external recording medium 148 is an SD card, a CF card, or the like that is removable from the image pickup apparatus 100, but is not limited to these examples.

The switch sense circuit 133 transmits an input signal to the MPU 130 according to the operation state of each switch. A switch SW1 (102*a*) is turned on by a first stroke of the shutter button 102 (half-pressing). A switch SW2 (102*b*) is turned on by a second stroke of the shutter button 102 (full pressing). The switch SW2 (102*b*) when turned on transmits an instruction to start imaging to the MPU 130. Connected to the switch sense circuit 133 are the main electronic dial 108, the mode switching dial 109, the power switch 107, the SET button 110, the multifunction button 113, and the like.

The MPU 130 communicates information via the accessory communication control circuit 118 the accessory contact 116 to use a function of an unillustrated accessory. The power supply circuit 134 distributes and supplies power from a battery 143 to each element in the image pickup apparatus 100. The battery check circuit 135 is connected to the battery 143 and notifies the MPU 130 of remaining amount information about the battery 143 and the like.

Figure 3:
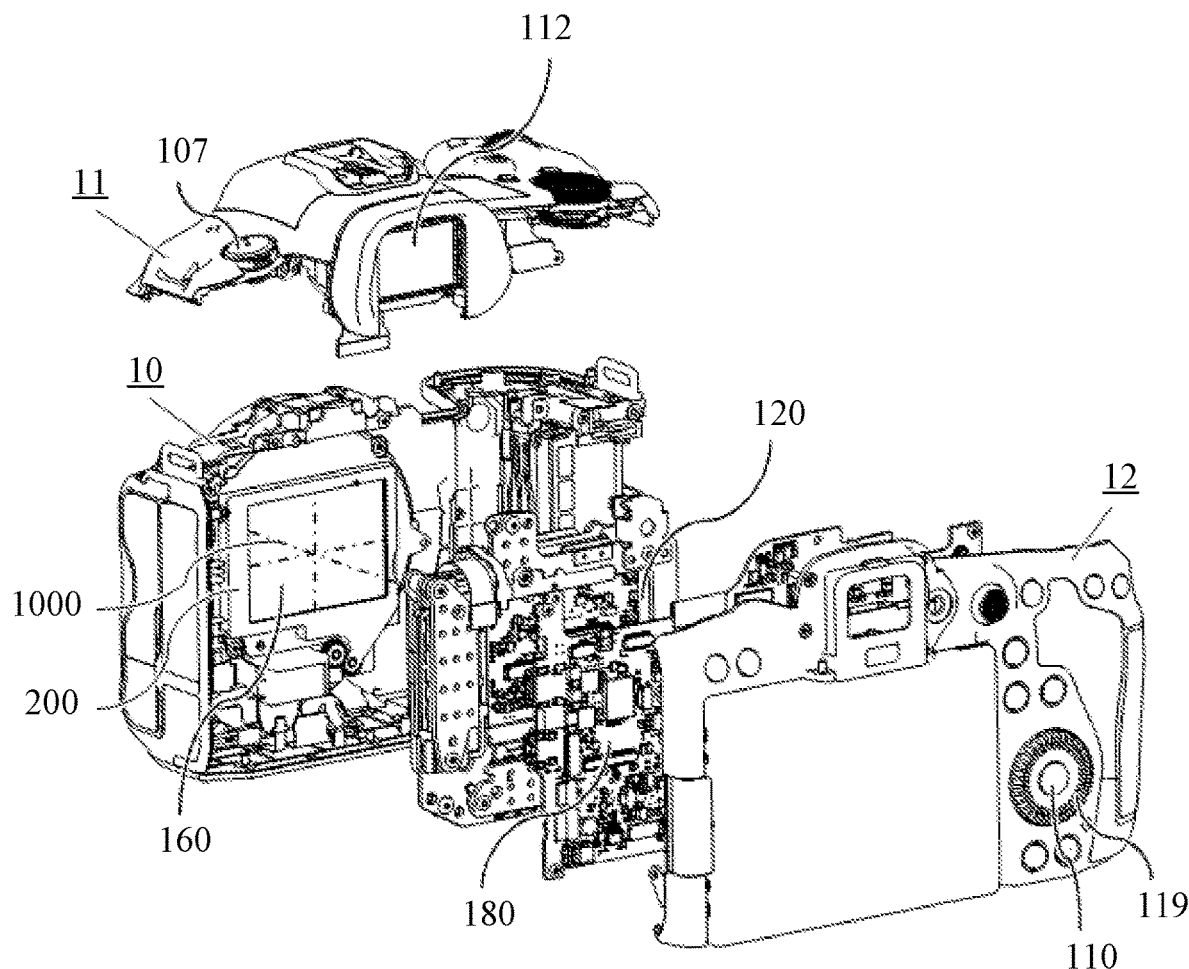
FIG. 3 is an exploded perspective view of the image pickup apparatus according to this embodiment.

Referring now to FIG. 3, a description will be given of an internal configuration of the image pickup apparatus 100. FIG. 3 is an exploded perspective view of the image pickup apparatus 100. The image pickup apparatus 100 has a structure that is mainly covered by an exterior including a front cover 10, a top cover 11, and a rear cover 12, and operation members and display members are attached to each exterior. A holding member 200, an imaging unit 120, and a main board (control board) 180 are arranged in order from the object side along an optical axis (OP) 1000 of the imaging optical system, and the optical filter 160 is mounted on the holding member 200. The optical filter 160 may use any optical member such as an ND filter, a PL filter, a soft filter (low-pass filter), and the like. Moreover, even in a case where the optical filter 160 is not inserted, the image pickup apparatus 100 can be normally operated.

Figure 4A:
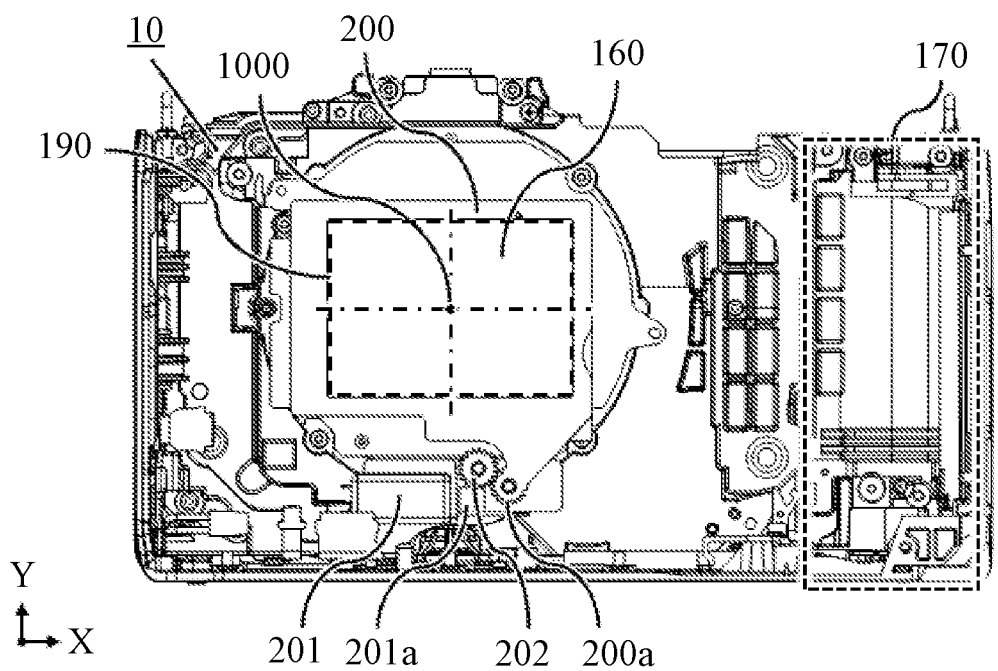
FIGS. 4A to 4C explain during driving of an optical filter in this embodiment.
Figure 4B:
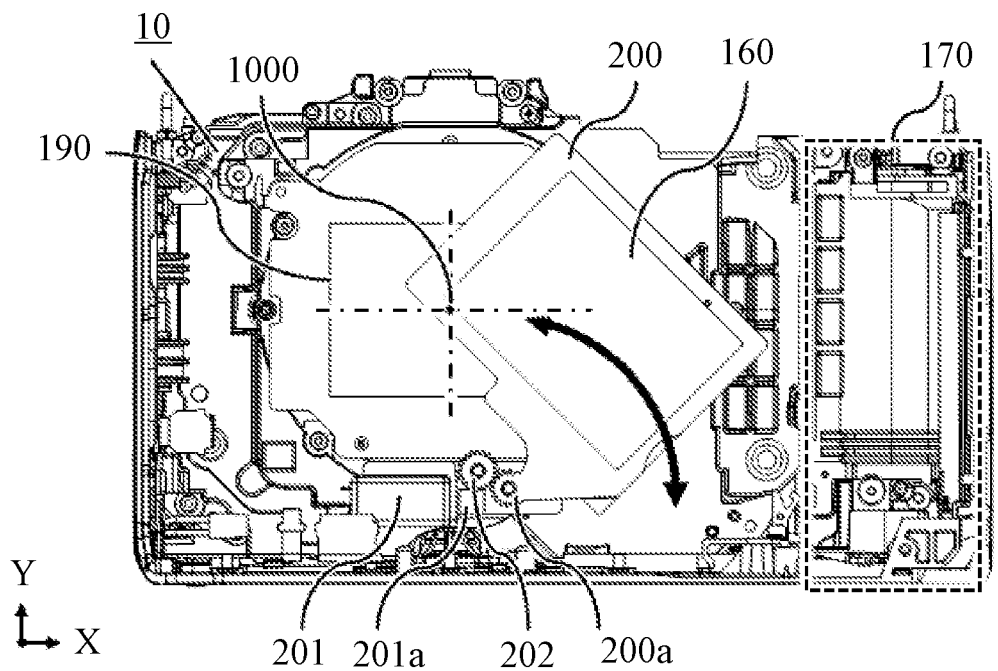
Figure 4C:
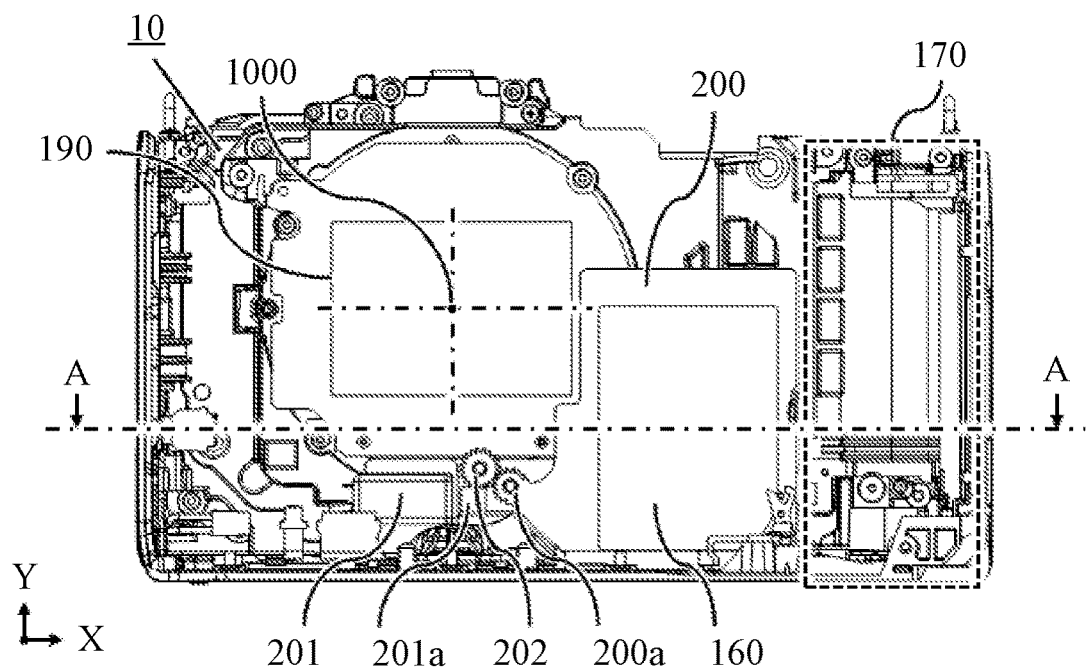

Referring now to FIGS. 4A to 4C, a description will be given of the configuration and switching operation of the optical filter 160. FIGS. 4A to 4C explain the driving of the optical filter 160, and illustrate the state of the components relating to the optical filter 160 and the holding member 200 viewed from the rear side of the image pickup apparatus 100.

The optical filter 160 is inserted into and held by the holding member 200. The holding member 200 has a gear shape 200*a* and is attached to the front cover 10 so as to be rotatable about the gear shape 200*a*. A motor (actuator, driving unit) 201 for driving the optical filter 160 is attached to the front cover 10, and a worm gear 201*a* is attached to a driving shaft of the motor 201. The worm gear 201*a* can rotate the holding member 200 by transmitting a rotational force to the gear shape 200*a* of the holding member 200 via an intermediate gear 202. A battery housing 170 for accommodating the battery 143 is provided on the right side of the front cover 10.

This embodiment assigns a switching function of insertion/retraction of the optical filter 160 to the multifunction button 113. A description will now be given of the operation for driving the optical filter 160 by the operation of the user. Another button, a dial, a switch, a setting screen, etc. may be used for the switching operation of the optical filter 160.

FIG. 4A illustrates a state (inserted state) in which the optical filter 160 is inserted into an opening 190 provided inside the mount portion 103 of the image pickup apparatus 100 and overlaps the opening 190. The opening 190 defines the imaging range. Thereby, the light incident on the image sensor 121 passes through the optical filter 160, and a variety of imaging expressions are available due to the effect of the optical filter 160. For example, in a case where an ND filter is inserted as the optical filter 160, incident light is attenuated, and long-exposure imaging and overexposure suppression can be acquired even in a bright environment.

In a case where the multifunction button 113 is pressed in the inserted state illustrated in FIG. 4A, the switch sense circuit 133 detects the pressing. At this time, The MPU 130 transmits an instruction to drive the motor 201, and the motor 201 starts rotating through the optical filter driving circuit 137. The rotation of the motor 201 is transmitted from the worm gear 201*a* to the gear shape 200*a* via the gear shape 200*a*, and the holding member 200 having the gear shape 200*a* starts rotating. FIG. 4B illustrates a state in the middle of the rotation (intermediate state).

The holding member 200 moves to a retracted state illustrated in FIG. 4C through the intermediate state illustrated in FIG. 4B. A rotation shaft of the gear shape 200*a* is located between the opening 190 and the bottom surface side of the image pickup apparatus 100 and between the optical axis 1000 and the short side of the opening 190 on the grip portion 101 side. Thereby, as illustrated in FIG. 4B, the holding member 200 can be rotated without interfering with internal parts such as the top cover 11. The motor 201 is also disposed closer to the bottom surface than the optical axis 1000 and the opening 190, the power transmission distance to the gear shape 200*a* is short, and the driving efficiency is enhanced.

In a case where the holding member 200 moves to the retracted position (second position) illustrated in FIG. 4C, the optical filter driving circuit 137 stops the motor 201 in response to a detection signal from a position sensor (not illustrated). The position sensor refers to a position detector such as a photo-reflector, but the driving stop timing may be determined based on any means, such as a detection of the rotation angle of the motor 201 and a mechanical switch.

FIG. 4C illustrates a state (retracted state) in which the holding member 200 is rotated by approximately 90 degrees on a plane parallel to the imaging unit 120 from the inserted state illustrated in FIG. 4A and retracted from the opening 190. By retracting the holding member 200, the light condensed by the lens apparatus 104 enters the image sensor 121 without passing through the optical filter 160.

Figure 5:
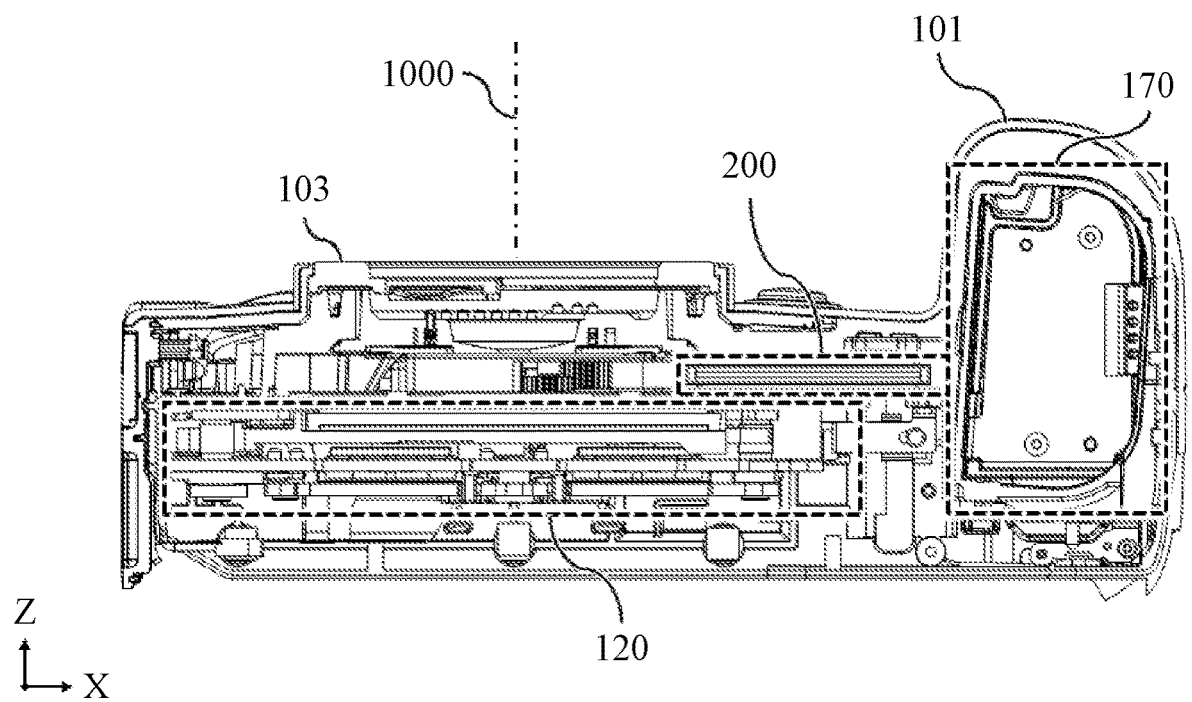
FIG. 5 is a sectional view of the image pickup apparatus according to this embodiment.

FIG. 5 is a sectional view of the image pickup apparatus 100, illustrating a section taken along a line A-A in FIG. 4C. As illustrated in FIG. 5, the holding member 200 is retracted to a space between the opening 190 and the battery housing 170, that is, between the opening 190 and the grip portion 101. By rotating the holding member 200 by approximately 90 degrees from the inserted state, the short side of the optical filter 160 becomes approximately parallel to an X direction (horizontal direction of the image pickup apparatus 100), and is accommodated in the space between the opening 190 and the battery housing 170.

In a case where the user intending to reinsert the optical filter 160 into the opening 190 presses the multifunction button 113 in the retracted state illustrated in FIG. 4C to rotate the motor 201 in the direction opposite to that in the operation described above. Thereby, the optical filter 160 is inserted as illustrated in FIG. 4A through the intermediate state illustrated in FIG. 4B. In a case where the optical filter 160 moves to the position in the inserted state (first position) illustrated in FIG. 4A, the optical filter driving circuit 137 stops the motor 201 by the detection signal of the position sensor (not illustrated), as in the retracted state.

This configuration can insert and retract the optical filter 160 to and from the optical axis 1000 without interfering with the internal parts or internal units of the image pickup apparatus 100. Therefore, the optical filter 160 can be incorporated without making larger the image pickup apparatus 100, and the optical filter 160 can be easily switched between the inserted state and the retracted state. In this embodiment, the configuration for switching the optical filter 160 between the inserted state and the saved state is not limited. For example, a mechanism for sliding the optical filter 160 in the horizontal direction of the image pickup apparatus 100 may be used to switch the optical filter 160 between the inserted state and the retracted state.

Figure 6A:
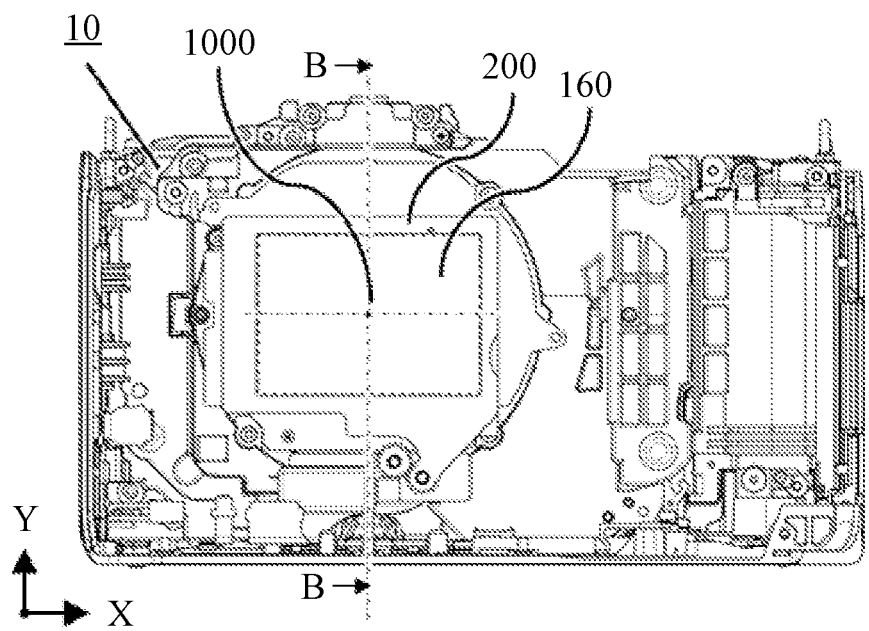
FIGS. 6A to 6C explain an optical path of light incident on an image sensor in this embodiment.
Figure 6B:
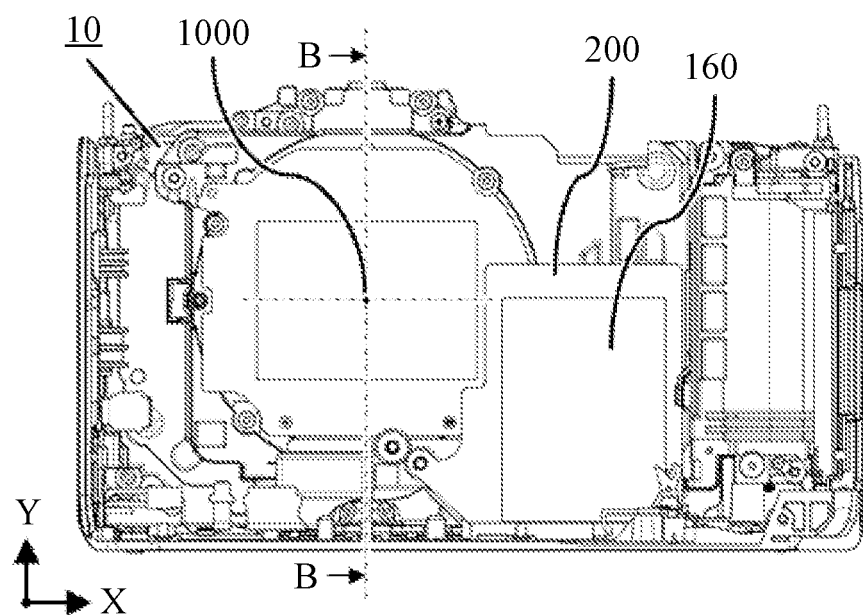
Figure 6C:
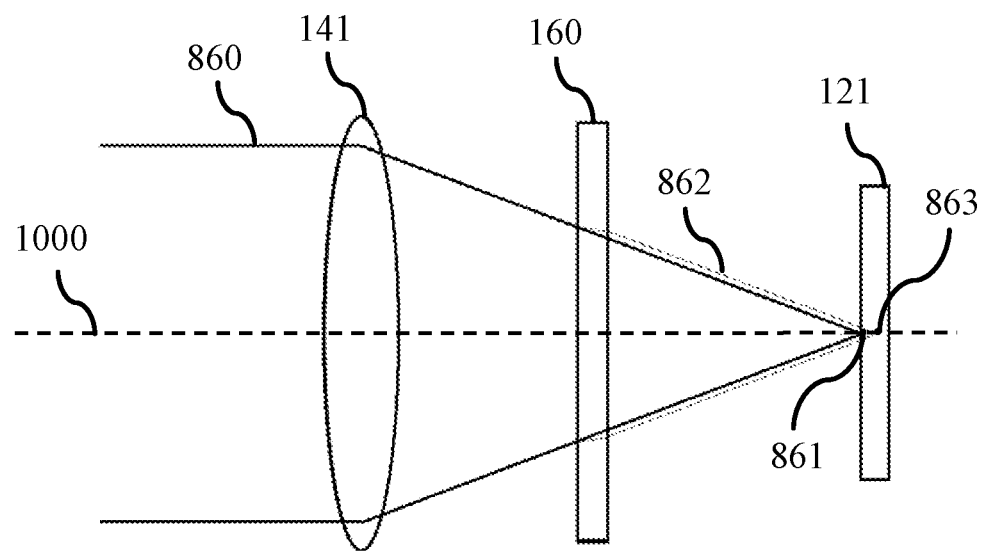

Referring now to FIGS. 6A to 6C, a description will be given of a control method of the image pickup apparatus 100. FIGS. 6A to 6C explain optical paths of light incident on the image sensor 121. FIG. 6A illustrates the image pickup apparatus 100 in the inserted state, FIG. 6B illustrates the image pickup apparatus 100 in the retracted state, and FIG. 6C illustrates the optical paths in the sections of the inserted state and retracted state taken along lines B-B including the optical axis 1000. In the retracted state, the optical filter 160 does not exist in the section taken along the line B-B, but FIG. 6C illustrates the optical filter 160 for comparing the optical path in the inserted state and the optical path in the retracted state.

In the inserted state of FIG. 6A, the light incident on the image sensor 121 passes through the optical filter 160, and the light passes through the optical path 862 indicated by a dashed line in FIG. 6C and forms an image at an imaging point 863. In the retracted state of FIG. 6B, the light enters the image sensor 121 without passing through the optical filter 160, but following the optical path 860 indicated by a solid line in FIG. 6C, and forms an image at an imaging point 861. Thus, the optical path length of the light incident on the image sensor 121 differs between the inserted state and the retracted state.

This embodiment sets a flange focal length such that the incident light forms an image on a plane (imaging plane) of the image sensor 121 in the retracted state. In the inserted state, the optical path length changes, and the focus position of the lens (in-focus position) changes to the rear side viewed from the light incident direction, which is a so-called rear focus state. Therefore, in the inserted state, the focus lens 141 may reach the driving limit and may not be able to be focused on a close object at the shortest object distance.

Figure 7:
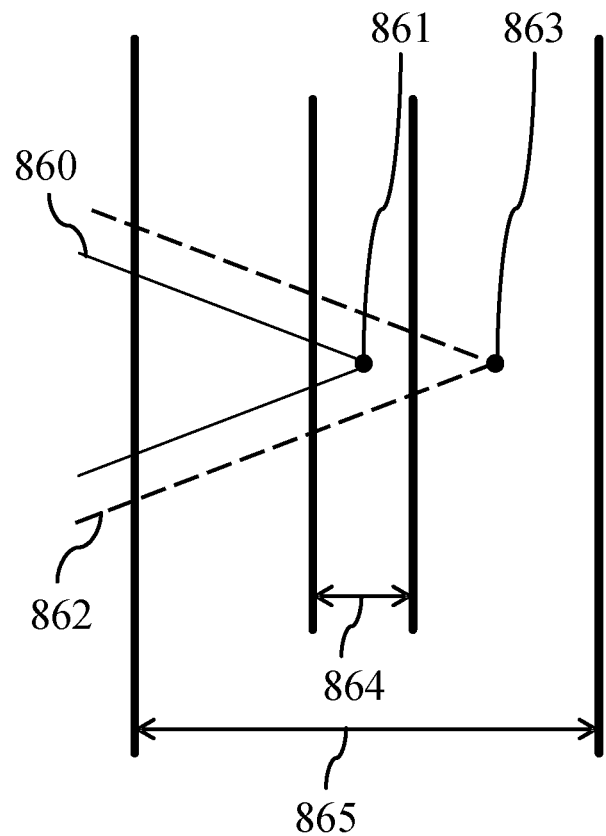
FIG. 7 illustrates a relationship between a depth of field and an imaging position in this embodiment.

Referring now to FIG. 7, a description will be given of a relationship between the depth of field and the imaging position. FIG. 7 illustrates a relationship between changes in the depth of field caused by driving the electromagnetic diaphragm 142 and the imaging points in the inserted and retracted states. Similar to FIG. 6C, FIG. 7 illustrates light incident from the left side forming an image, and a solid line illustrates an optical path 860 in the retracted state and a broken line indicates an optical path 862 in the inserted state. A depth of field is an apparent in-focus range. The depth of field changes depending on the setting of the electromagnetic diaphragm 142. In a case where an aperture in the electromagnetic diaphragm 142 is narrowed, the depth of field changes from a first depth of field 864 to a second depth of field 865.

In a case where an in-focus state on a close object is not obtained in the inserted state, the depth of field is set to the first depth of field 864, and an image is formed at the imaging point 863 in the inserted state outside the range of the first depth of field 864. Therefore, by setting the depth of field to the second depth of field 865, the imaging point 863 in the inserted state can fall within the range of the second depth of field 865 and the in-focus state can be obtained. Thus, narrowing the aperture in the electromagnetic diaphragm 142 to increase the depth of field can provide an in-focus state on a close object. As understood from the description with reference to FIG. 6C, the in-focus state on the close object is obtained by transferring the inserted state to the retracted state.

In a case where an in-focus state on a close object is not obtained even in the inserted state, these methods are applied according to the imaging scene. For example, in a scene where there is a bright moving object within an imaging angle of view, the shutter speed is not changed, the aperture in the electromagnetic diaphragm 142 is narrowed (or made smaller), and the ISO speed is increased. An in-focus state can be obtained by narrowing the aperture in the electromagnetic diaphragm 142, and a luminance change caused by the aperture change is adjusted by increasing the ISO speed.

In a scene with no bright moving object within an imaging angle of view, the aperture in the electromagnetic diaphragm 142 is narrowed and the shutter speed is lowered. An in-focus state can be obtained by narrowing the aperture in the electromagnetic diaphragm 142, and a luminance change caused by the aperture change is adjusted by lowering the shutter speed.

In a scene where there is a dark moving object within an imaging angle of view, the shutter speed is not changed, the optical filter 160 is retracted, and the ISO speed is lowered. Retracting the optical filter 160 can provide an in-focus state, and lowering the ISO speed can adjust a luminance change in an object caused by retracting the optical filter 160.

In a scene with no dark moving object within an imaging angle of view, the optical filter 160 is retracted and the shutter speed is increased. Retracting the optical filter 160 can provide an in-focus state, and increasing the shutter speed can adjust a luminance change caused by the aperture change.

The brightness/darkness of the object can be determined by the luminance signal read out of the image sensor 121. Whether or not there is a moving object can be determined by the well-known object detection technology and image recognition technology. For example, any configurations may be used as long as the motion of the object is determined based on a change in motion vector between consecutive images. A moving object is, for example, an animal, a vehicle, or a waterfall, and it is determined that there is a moving object in a case where the object is moving at a certain speed or higher. In this embodiment, AF is performed by the image-plane phase-difference AF, but another AF method may be used.

Figure 8:
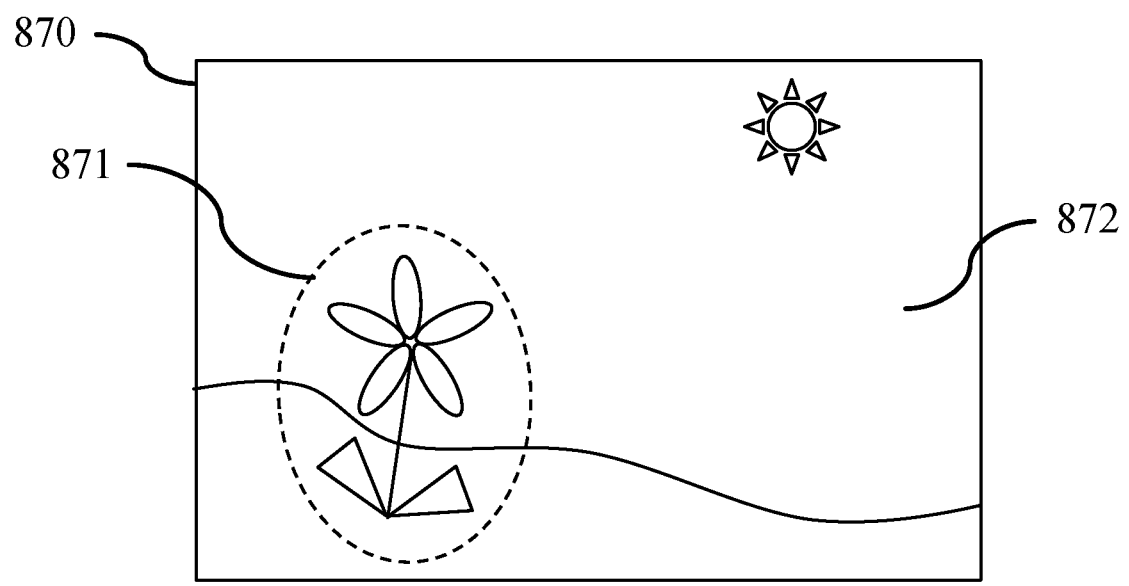
FIG. 8 explains a defocus map in this embodiment.

Referring now to FIG. 8, a description will be given of a method of determining whether or not an in-focus state on a close object can be obtained in the inserted state. FIG. 8 explains a defocus map (defocus map information). In AF that attempts to focus on a first object 871 for imaging at an imaging angle of view 870, defocus amounts corresponding to distance information to the first object 871 and a second object 872 as the background within the imaging angle of view 870 are acquired. The defocus map includes defocus amount information within the imaging angle of view 870. During AF, the defocus map is created by the MPU 130 based on the defocus amounts detected using the focus signals read out of the image sensor 121.

Information on the thickness and refractive index of the optical filter 160 is previously set in the memory of the camera. The MPU 130 acquires information on the thickness and refractive index of the optical filter 160 and calculates the optical path lengths in the inserted state and retracted state. It is possible to determine based on the defocus map and the optical path length information that an in-focus state on the first object 871 as a target to be focused can be obtained in the retracted state, but an in-focus state on the first object 871 in the inserted state cannot be obtained. It is therefore possible to determine whether or not the current imaging faces a situation that can provide an in-focus state on a close object. Since the calculation of the optical path length in a direction along the optical axis 1000 depending on the presence or absence of the optical member is well-known, a detailed description thereof will be omitted.

Figure 9:
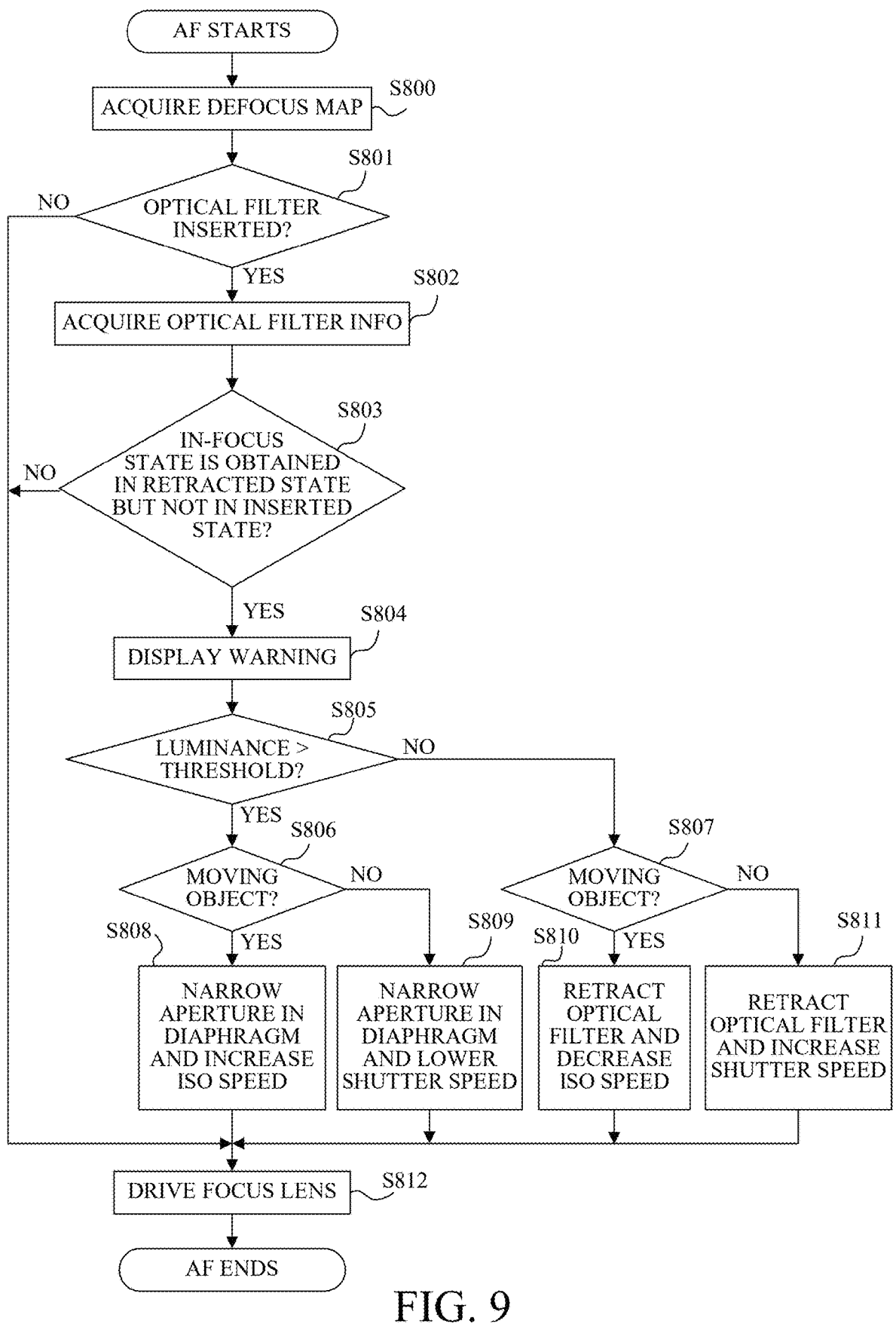
FIG. 9 is a flowchart of autofocus (AF) in a totally automatic imaging mode according to this embodiment.

Referring now to FIG. 9, a description will be given of a control method of the image pickup apparatus 100 in a totally automatic imaging mode (auto mode). FIG. 9 is a flowchart of AF processing in the totally automatic imaging mode. As described above, the user can set a variety of imaging modes of the image pickup apparatus 100 by operating the mode switching dial 109. The totally automatic imaging mode is an imaging mode in which the F-number, the shutter speed, and the ISO speed are automatically set according to the luminance (brightness) of the object.

In a case where the user starts imaging and AF processing starts, first, in step S800, the MPU 130 acquires the defocus map. Next, in step S801, the MPU 130 determines whether the optical filter 160 is inserted. In a case where the optical filter 160 is not inserted (or retracted), the flow proceeds to step S812. In step S812, the MPU 130 drives the focus lens 141 and ends this flow. On the other hand, in a case where the optical filter 160 is inserted, the flow proceeds to step S802. In step S802, the MPU 130 acquires optical filter information. The optical filter information is information about the thickness and refractive index of the optical filter 160 as described above.

Next, in step S803, the MPU 130 determines whether or not an in-focus state on the object is obtained in the retracted state but an in-focus state on the object is not obtained in the inserted state. The determination as to whether or not the in-focus state is obtained is made, for example, by calculating the defocus amount of the image based on a well-known method and by determining whether or not the calculated defocus amount falls within a predetermined range.

In a case where the in-focus state on the object is obtained both in the retracted state and in the inserted state, the flow proceeds to step S812. In step S812, the MPU 130 drives the focus lens 141 and ends this flow. On the other hand, in a case where the in-focus state on the object is obtained in the retracted state but the in-focus state on the object is not obtained in the inserted state, the flow proceeds to step S804. In step S804, MPU 130 displays a warning. This warning is issued, for example, by displaying an icon indicating a warning on a display unit such as the liquid crystal monitor 111 or the electronic viewfinder 112. A written warning may be provided. This warning is for notifying the user of a change in imaging parameters.

Next, in step S805, the MPU 130 determines whether or not the luminance during imaging is higher than a threshold (luminance>threshold). As the unit of luminance, 1BV in the so-called APEX (additive system of photographic exposure) is set to one stage of luminance (photometric value). In a case where the luminance is higher than the threshold, the flow proceeds to step S806. On the other hand, in a case where the luminance is not higher than the threshold, the flow proceeds to step S807. Then, in step S806 or step S807, the MPU 130 determines whether or not there is a moving object. In a case where it is determined in step S806 that there is a moving object, the flow proceeds to step S808. On the other hand, in a case where it is determined in step S806 that there is no moving object, the flow proceeds to step S809. In a case where it is determined in step S807 that there is a moving object, the flow proceeds to step S810. On the other hand, in a case where it is determined in step S807 that there is no moving object, the flow proceeds to step S811.

In step S808, the MPU 130 narrows the aperture in the electromagnetic diaphragm (lens diaphragm) 142 and increases the ISO speed. In step S809, the MPU 130 narrows the aperture in the electromagnetic diaphragm (lens diaphragm) 142 and lowers the shutter speed. In step S810, the MPU 130 retracts the optical filter 160 and decreases the ISO speed. In step S811, the MPU 130 retracts the optical filter 160 and increases the shutter speed. After any one of steps S808, S809, S810, and S811 is performed, the flow proceeds to step S812, the MPU 130 drives the focus lens 141 and ends this flow. This control can provide an in-focus state on a close object according to an imaging scene.

Figure 10:
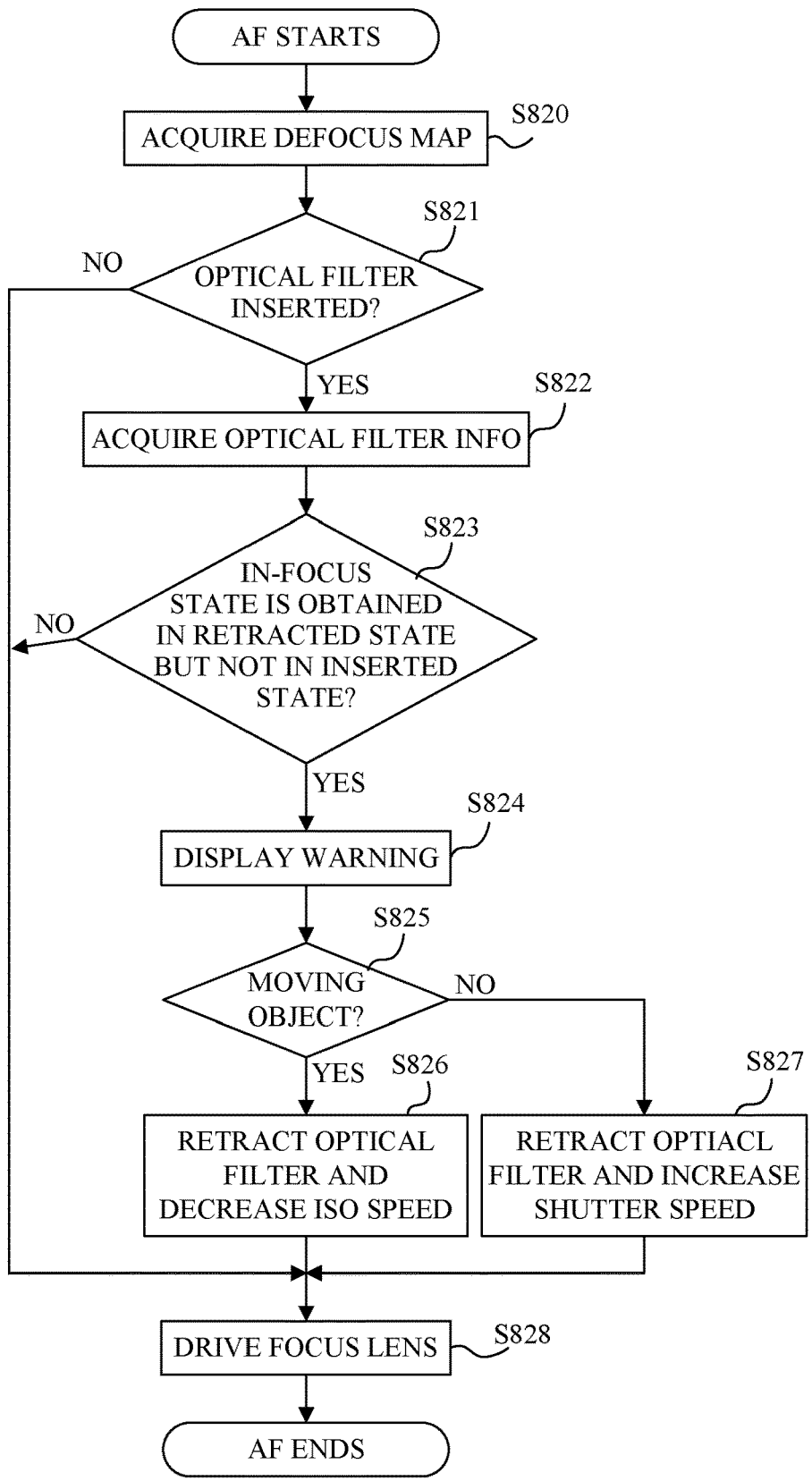
FIG. 10 is a flowchart of AF in an F-number priority imaging mode in this embodiment.

Referring now to FIG. 10, a description will now be given of a control method in a case where the inserted state and the retracted state are changed by the control in an F-number priority imaging mode. FIG. 10 is a flowchart of AF in the F-number priority imaging mode. In the F-number priority imaging mode, the F-number (aperture value) is set by the user. Therefore, the control flow does not change the F-number against the intention of the user.

After the user starts imaging and AF starts, first, in step S820, the MPU 130 acquires a defocus map. Next, in step S821, the MPU 130 determines whether or not the optical filter 160 is inserted. In a case where the optical filter 160 is not inserted (or retracted), the flow proceeds to step S828. In step S828, the MPU 130 drives the focus lens 141 and ends this flow. On the other hand, in a case where the optical filter 160 is inserted, the flow proceeds to step S822. In step S822, the MPU 130 acquires optical filter information. The optical filter information is information about the thickness and refractive index of the optical filter 160 as described above.

Next, in step S823, the MPU 130 determines whether or not the in-focus state on the object is obtained in the retracted state but the in-focus state on the object is not obtained in the inserted state. In a case where the in-focus state on the object is obtained both in the retracted state and in the inserted state, the flow proceeds to step S828. In step S828, the MPU 130 drives the focus lens 141 and ends this flow. On the other hand, in a case where the in-focus state on the object is obtained in the retracted state but the in-focus state on the object is not obtained in the inserted state, the flow proceeds to step S824. In step S824, MPU 130 displays a warning. This warning is issued, for example, by displaying an icon indicating a warning on a display unit such as the liquid crystal monitor 111 or the electronic viewfinder 112. A written warning may be provided. This warning is for notifying the user of a change in imaging parameters.

Next, in step S825, the MPU 130 determines whether or not there is a moving object. In a case where it is determined in step S825 that there is a moving object, the flow proceeds to step S826. On the other hand, in a case where it is determined in step S825 that there is no moving object, the flow proceeds to step S827.

In step S826, the MPU 130 retracts the optical filter 160 and lowers the ISO speed. In step S827, the MPU 130 retracts the optical filter 160 and increases the shutter speed. After step S826 or S827 is performed, the flow proceeds to step S828, the MPU 130 drives the focus lens 141 and ends this flow. This control can provide an in-focus state on a close object according to an imaging scene.

Figure 11:
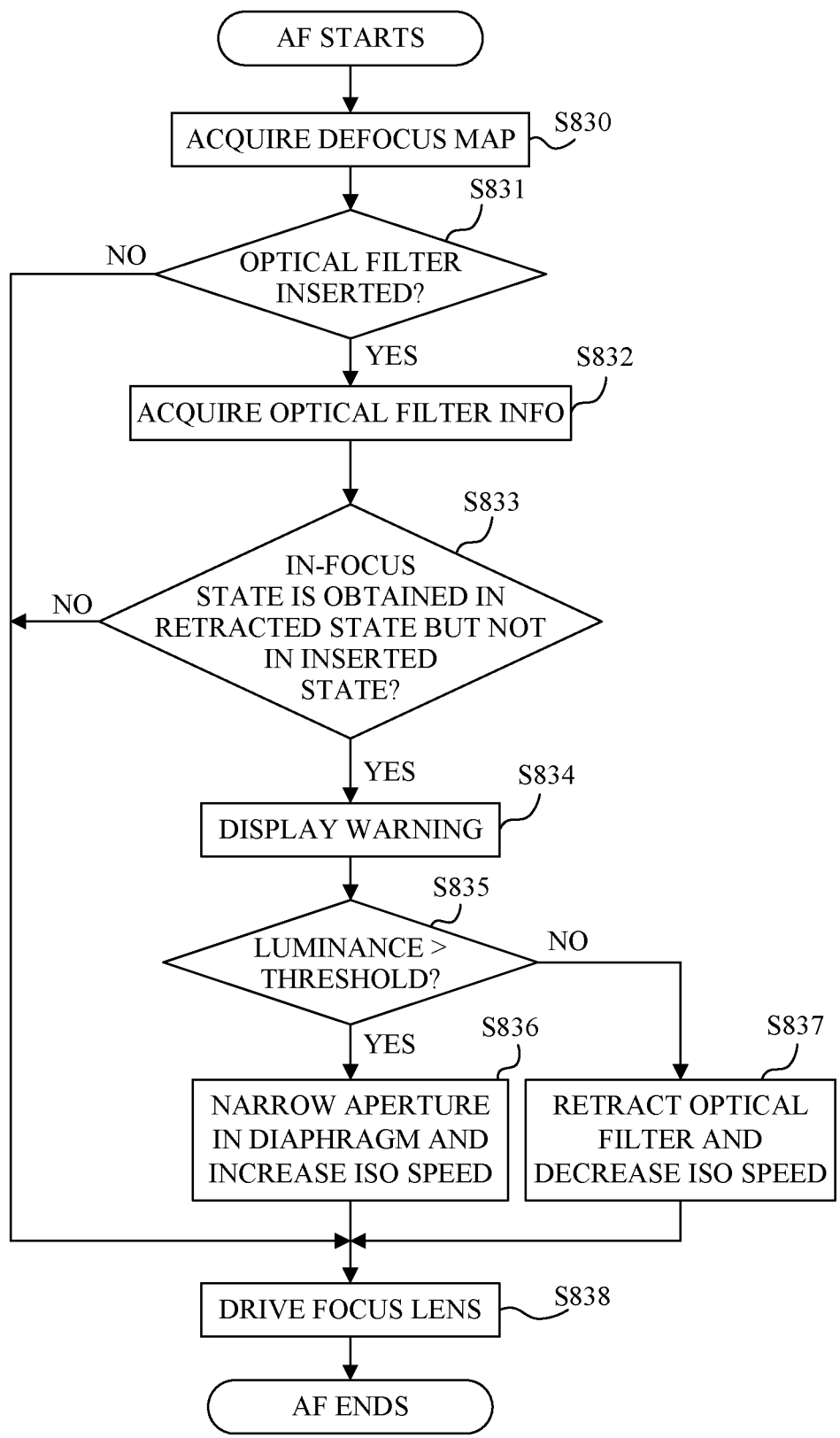
FIG. 11 is a flowchart of AF in a shutter speed priority imaging mode in this embodiment.

Referring now to FIG. 11, a description will be given of a control method in a case where the control changes the inserted state and the retracted state in a shutter speed priority imaging mode. FIG. 11 is a flowchart of AF in the shutter speed priority imaging mode. In the shutter speed priority imaging mode, the shutter speed is set by the user. Therefore, a control flow does not change the shutter speed against the intention of the user.

In a case where the user starts imaging and AF starts, first, in step S830, the MPU 130 acquires a defocus map. Next, in step S831, the MPU 130 determines whether or not the optical filter 160 is inserted. In a case where the optical filter 160 is not inserted (or retracted), the flow proceeds to step S838. In step S838, the MPU 130 drives the focus lens 141 and ends this flow. On the other hand, in a case where the optical filter 160 is inserted, the flow proceeds to step S832. In step S832, the MPU 130 acquires optical filter information. The optical filter information is information about the thickness and refractive index of the optical filter 160 as described above.

Next, in step S833, the MPU 130 determines whether or not the in-focus state on the object is obtained in the retracted state but the in-focus state on the object in the inserted state is not obtained. In a case where the in-focus state on the object is obtained both in the retracted state and in the inserted state, the flow proceeds to step S838. In step S838, the MPU 130 drives the focus lens 141 and ends this flow. On the other hand, in a case where the in-focus state on the object is obtained in the retracted state but the in-focus state on the object is not obtained in the inserted state, the flow proceeds to step S834. In step S834, MPU 130 displays a warning. This warning is issued, for example, by displaying an icon indicating a warning on a display unit such as the liquid crystal monitor 111 or the electronic viewfinder 112. A written warning may be provided. This warning is for notifying the user of a change in imaging parameters.

Next, in step S835, the MPU 130 determines whether or not the luminance during imaging is higher than a threshold (luminance>threshold). In a case where the luminance is higher than the threshold, the flow proceeds to step S836. On the other hand, in a case where the luminance is not higher than the threshold, the flow proceeds to step S837.

In step S836, the MPU 130 narrows the aperture in the electromagnetic diaphragm (lens diaphragm) 142 and increases the ISO speed. In step S837, the MPU 130 retracts the optical filter 160 and lowers the ISO speed. After step S836 or S837 is performed, in step S838, the MPU 130 drives the focus lens 141 and ends this flow. This control can provide an in-focus state on a close object according to an imaging scene.

Figure 12:
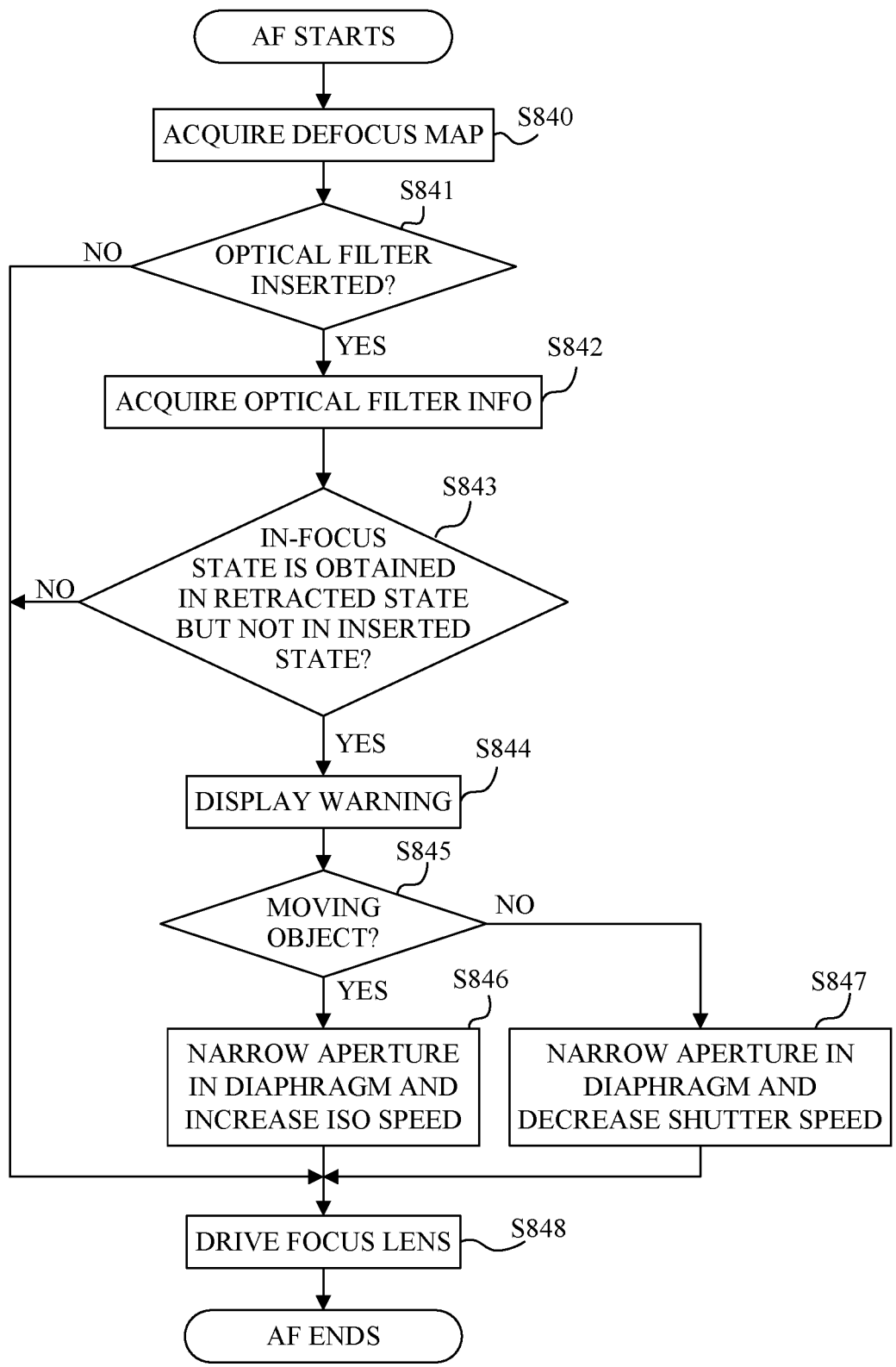
FIG. 12 is a flowchart of AF while the optical filter according to this embodiment maintains a state selected by a user.

Referring now to FIG. 12, a description will be given of a control method for maintaining the state selected by the user instead of automatically changing the inserted state and retracted state of the optical filter 160. FIG. 12 is a flowchart of AF in a case where the optical filter 160 maintains the state selected by the user. In this embodiment, the insertion state and retraction state of the optical filter 160 can be set variable only by the selection of the user. In that case, the changing method from the inserted state to the retracted state cannot be applied in order to provide an in-focus state on a close object. Thus, this method narrows the aperture in the electromagnetic diaphragm 142 to deepen the depth of field, and thereby provides an in-focus state on a close object.

In a case where the user starts imaging and AF starts, first, in step S840, the MPU 130 acquires a defocus map. Next, in step S841, the MPU 130 determines whether or not the optical filter 160 is inserted. In a case where the optical filter 160 is not inserted (or retracted), the flow proceeds to step S848. In step S848, the MPU 130 drives the focus lens 141 and ends this flow. On the other hand, in a case where the optical filter 160 is inserted, the flow proceeds to step S842. In step S842, the MPU 130 acquires optical filter information. The optical filter information is information about the thickness and refractive index of the optical filter 160 as described above.

Next, in step S843, the MPU 130 determines whether or not the in-focus state on the object is obtained in the retracted state but the in-focus state on the object is not obtained in the inserted state. In a case where the in-focus state is obtained both in the retracted state and in the inserted state, the flow proceeds to step S848. In step S848, the MPU 130 drives the focus lens 141 and ends this flow. On the other hand, in a case where the in-focus state on the object is obtained in the retracted state but the in-focus state on the object is not obtained in the inserted state, the flow proceeds to step S844. In step S844, MPU 130 displays a warning. This warning is issued, for example, by displaying an icon indicating a warning on a display unit such as the liquid crystal monitor 111 or the electronic viewfinder 112. A written warning may be provided. This warning is for notifying the user of a change in imaging parameters.

Next, in step S845, the MPU 130 determines whether or not there is a moving object. In a case where it is determined in step S845 that there is a moving object, the flow proceeds to step S846. On the other hand, in a case where it is determined in step S845 that there is no moving object, the flow proceeds to step S847.

In step S846, the MPU 130 narrows the aperture in the electromagnetic diaphragm (lens diaphragm) 142 and increases the ISO speed. In step S847, the MPU 130 narrows the aperture in the electromagnetic diaphragm (lens diaphragm) 142 and lowers the shutter speed. After step S846 or S847 is performed, the flow proceeds to step S848, the MPU 130 drives the focus lens 141 and ends this flow. This control can provide an in-focus state on a close object according to an imaging scene.

As described above, the image pickup apparatus 100 includes the optical filter 160 and the control unit (MPU 130) configured to provide exposure control. The optical filter 160 is movable between the first position at which the optical filter 160 is inserted into the imaging range (opening 190) of the image sensor and the second position at which the optical filter 160 is retracted from the imaging range. The first position is the position where the optical filter 160 covers the imaging range (the imaging area including the optical axis 1000), and the second position is the position where the optical filter 160 does not overlap the imaging range. The control unit provides the exposure control in a case where the optical filter is located at the first position and the in-focus state cannot be obtained by moving a focus lens.

The control unit may provide the exposure control in a case where the optical filter 160 is located at the first position, the focus lens 141 is located at a driving limit position, and the in-focus state on a close object cannot be obtained. The control unit may provide the exposure control by changing the setting of the lens diaphragm (electromagnetic diaphragm 142). The control unit may provide the exposure control by moving the optical filter 160 from the first position to the second position. The control unit may provide the exposure control when determining that the in-focus state on the object is obtained in a case where the optical filter is located at the second position, but the in-focus state is not obtained in a case where the optical filter is located at the first position, based on defocus map information and optical filter information.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

Each embodiment can provide an image pickup apparatus, a control method of the image pickup apparatus, and a storage medium, each of which can provide an in-focus state on an object in a case where an in-focus state cannot be obtained by moving a focus lens while an optical filter is used.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions. For example, this embodiment has discussed the configuration for controlling the insertion/removal of the optical filter 160 when the user presses the multifunction button 113, but this embodiment is not limited to this example. For example, in a case where the insertion and removal of the optical filter 160 can be adjusted as one of the parameters for the exposure control, the image pickup apparatus 100 may automatically insert or remove the optical filter 160 according to the luminance (brightness) of the object.

This application claims the benefit of Japanese Patent Application No. 2022-032364, filed on Mar. 3, 2022, which is hereby incorporated by reference herein in its entirety.

What is claimed is:

1. An image pickup apparatus comprising:
an image sensor;
an optical filter movable between a first position at which the optical filter is inserted into an imaging range of the image sensor and a second position at which the optical filter is retracted from the imaging range; and
at least one processor, and a memory coupled to the at least one processor, the memory having instructions that, when executed by the processor, perform operations as a control unit configured to perform exposure control for the image sensor in a case where the optical filter is located at the first position and in a case where the control unit determines, based on defocus map information and optical filter information, that the in-focus state is obtained with the optical filter located at the second position but the in-focus state is not obtained with the optical filter located at the first position.

2. The image pickup apparatus according to claim 1, wherein the first position is a position where the optical filter covers the imaging range, and the second position is a position where the optical filter does not overlap the imaging range.

3. The image pickup apparatus according to claim 1, wherein the control unit performs the exposure control by changing a setting of an aperture stop.

4. The image pickup apparatus according to claim 1, wherein the control unit displays a warning on a display unit in a case where the optical filter is located at the first position and the in-focus state cannot be obtained.

5. The image pickup apparatus according to claim 1, wherein the control unit changes a method for the exposure control based on luminance of an object.

6. The image pickup apparatus according to claim 1, wherein the control unit changes a method for the exposure control based on a motion of the object.

7. An image pickup apparatus comprising:
an image sensor;
an optical filter movable between a first position at which the optical filter is inserted into an imaging range of the image sensor and a second position at which the optical filter is retracted from the imaging range; and
at least one processor, and a memory coupled to the at least one processor, the memory having instructions that, when executed by the processor, perform operations as a control unit configured to perform exposure control for the image sensor in a case where the optical filter is located at the first position and an in-focus state cannot be obtained by moving a focus lens,
wherein the control unit performs the exposure control by moving the optical filter from the first position to the second position and by lowering an ISO speed in a case where an imaging mode is set to an F-number priority imaging mode.

8. An image pickup apparatus comprising:
an image sensor;
an optical filter movable between a first position at which the optical filter is inserted into an imaging range of the image sensor and a second position at which the optical filter is retracted from the imaging range; and
at least one processor, and a memory coupled to the at least one processor, the memory having instructions that, when executed by the processor, perform operations as a control unit configured to perform exposure control for the image sensor in a case where the optical filter is located at the first position and an in-focus state cannot be obtained by moving a focus lens,
wherein the control unit performs the exposure control by moving the optical filter from the first position to the second position and by increasing a shutter speed in a case where an imaging mode is set to an F-number priority imaging mode.

9. An image pickup apparatus comprising:
an image sensor;
an optical filter movable between a first position at which the optical filter is inserted into an imaging range of the image sensor and a second position at which the optical filter is retracted from the imaging range; and
at least one processor, and a memory coupled to the at least one processor, the memory having instructions that, when executed by the processor, perform operations as a control unit configured to perform exposure control for the image sensor in a case where the optical filter is located at the first position and an in-focus state cannot be obtained by moving a focus lens,
wherein the control unit performs the exposure control by changing a setting of an aperture stop and by increasing an ISO speed in a case where an imaging mode is set to a shutter speed priority imaging mode.

10. An image pickup apparatus comprising:
an image sensor;
an optical filter movable between a first position at which the optical filter is inserted into an imaging range of the image sensor and a second position at which the optical filter is retracted from the imaging range; and
at least one processor, and a memory coupled to the at least one processor, the memory having instructions that, when executed by the processor, perform operations as a control unit configured to perform exposure control for the image sensor in a case where the optical filter is located at the first position and an in-focus state cannot be obtained by moving a focus lens,
wherein the control unit performs the exposure control by moving the optical filter from the first position to the second position and by lowering an ISO speed in a case where an imaging mode is set to a shutter speed priority imaging mode.

11. An image pickup apparatus comprising:
an image sensor;
an optical filter movable between a first position at which the optical filter is inserted into an imaging range of the image sensor and a second position at which the optical filter is retracted from the imaging range; and
at least one processor, and a memory coupled to the at least one processor, the memory having instructions that, when executed by the processor, perform operations as a control unit configured to perform exposure control for the image sensor in a case where the optical filter is located at the first position and an in-focus state cannot be obtained by moving a focus lens,
wherein the control unit performs the exposure control by changing a setting of an aperture stop and by increasing an ISO speed in a case where the optical filter is set to maintain a state selected by a user.

12. An image pickup apparatus comprising:
an image sensor;
an optical filter movable between a first position at which the optical filter is inserted into an imaging range of the image sensor and a second position at which the optical filter is retracted from the imaging range; and
at least one processor, and a memory coupled to the at least one processor, the memory having instructions that, when executed by the processor, perform operations as a control unit configured to perform exposure control for the image sensor in a case where the optical filter is located at the first position and an in-focus state cannot be obtained by moving a focus lens,
wherein the control unit performs the exposure control by changing a setting of an aperture stop and by lowering a shutter speed in a case where the optical filter is set to maintain a state selected by a user.

13. The image pickup apparatus according to claim 1, wherein the optical filter is an ND filter, a PL filter, or a soft filter.

14. A method of controlling an image pickup apparatus that includes an image sensor and an optical filter, the method comprising:
a first determination step of determining whether the optical filter is located at a first position at which the optical filter is inserted into an imaging range of the image sensor or a second position at which the optical filter is retracted from the imaging range;
a second determination step of determining whether or not an in-focus state can be obtained by moving a focus lens while the optical filter is located at the first position, and
an exposure control step of performing exposure control for the image sensor in a case where the first determination step determines that the optical filter is located at the first position and in a case where the second determination step determines, based on defocus map information and optical filter information, that the in-focus state can be obtained with the optical filter located at the second position but the in-focus state cannot be obtained with the optical filter located at the first position.

15. A non-transitory computer-readable storage medium storing a program that causes a computer to execute the control method according to claim 14.

* * * * *